United States Patent
Uchida

(10) Patent No.: US 8,180,325 B2
(45) Date of Patent: May 15, 2012

(54) TERMINAL UNIT, DEVICE UNIT, ILLICIT USE PREVENTION SYSTEM, METHOD AND PROGRAM

(75) Inventor: Kaoru Uchida, Tokyo (JP)

(73) Assignee: NEC Corporation, Tokyo (JP)

(*) Notice: Subject to any disclaimer, the term of this patent is extended or adjusted under 35 U.S.C. 154(b) by 485 days.

(21) Appl. No.: 12/439,948

(22) PCT Filed: Jul. 25, 2007

(86) PCT No.: PCT/JP2007/064609
§ 371 (c)(1),
(2), (4) Date: Mar. 4, 2009

(87) PCT Pub. No.: WO2008/032493
PCT Pub. Date: Mar. 20, 2008

(65) Prior Publication Data
US 2010/0197273 A1 Aug. 5, 2010

(30) Foreign Application Priority Data
Sep. 15, 2006 (JP) ................................. 2006-251139

(51) Int. Cl.
*H04M 3/16* (2006.01)
(52) U.S. Cl. ........................................ 455/411; 455/410
(58) Field of Classification Search .................. 455/410, 455/411
See application file for complete search history.

(56) References Cited

U.S. PATENT DOCUMENTS 7,729,815 B2 * 6/2010 Watanabe et al. .................. 701/2
2005/0193144 A1 * 9/2005 Hassan et al. .................. 709/238

FOREIGN PATENT DOCUMENTS

| JP | 2002300651 A | 10/2002 |
|---|---|---|
| JP | 2003524341 A | 8/2003 |
| JP | 2004102882 A | 4/2004 |
| JP | 2004260486 A | 9/2004 |
| JP | 2004297256 A | 10/2004 |
| JP | 2004343677 A | 12/2004 |
| JP | 2005236579 A | 9/2005 |
| JP | 2006020002 A | 1/2006 |
| JP | 2006020226 A | 1/2006 |
| JP | 2006033025 A | 2/2006 |
| JP | 2006222567 A | 8/2006 |

OTHER PUBLICATIONS

International Search Report for PCT/JP2007/064609 mailed Oct. 30, 2007.

* cited by examiner

*Primary Examiner* — Kwasi Karikari

(57) ABSTRACT

To provide the safety of preventing the illicit use of others by using a state as to whether or not the essential function of the device is not in use in locking the terminal to prohibit the use. A user terminal 10 makes a determination whether or not a device unit 20 is in a use state, the terminal unit 10 is locked after a predetermined second time from a last operation signal from the device unit 20, if the device unit 20 is not in use, irrespective of the network connection.

7 Claims, 3 Drawing Sheets

TERMINAL UNIT, DEVICE UNIT, ILLICIT USE PREVENTION SYSTEM, METHOD AND PROGRAM

This application is the National Phase of PCT/JP2007/064609, filed Jul. 25, 2007, which is based upon and claims the benefit of priority from Japanese patent application No. 2006-251139, filed on Sep. 15, 2006, the disclosure of which is incorporated herein in its entirety by reference.

TECHNICAL FIELD

The present invention relates to a technique for locking a personal information terminal unit to prohibit the use.

BACKGROUND ART

In a personal information terminal unit (hereinafter referred to as a "terminal") such as a portable telephone, there is a relevant illicit use prevention method for preventing the use of a part or all of the functions for the terminal except for the authorized user in which the registered user is regarded as the authorized user, and if the unregistered user tries to use the terminal, the terminal is locked to prohibit the use.

One of the determination methods for the authorized user or the unauthorized user is a method of property authentication in which if the user possesses something registered beforehand other than the terminal, the user is regarded as authorized, or if not, the user is regarded as unauthorized.

An example of technique based on such method has been described in patent document 1. With this technique, a wristwatch is a device for the above purpose, each of the wristwatch and the terminal including a short distance wireless communication interface to enable the short distance wireless communication between the wristwatch and the terminal, and when the terminal can not receive a transmission packet transmitted regularly from the wristwatch, the terminal asks for a user authentication through the input of a password or biometric information, and performs a power off process if the authentication is unsuccessful, thereby preventing the illicit use.

However, with this technique, it is required that each the wristwatch and the terminal includes the short distance wireless communication interface dedicated for the above purpose, accordingly increasing the hardware and software, causing a demerit problem that the device is more expensive due to increased costs, has a larger size to limit the design, and is heavier in weight and hard to use.

In this way, since it is expensive to prepare the communication interface dedicated for the purpose of preventing the illicit use on both sides, a method using the existent communication is well known as a realistic solution strategy. As one example, the method relies on whether or not the user has a device such as a head set that may be used with the portable telephone as a pair. In patent document 2, for example, there is a technique for preventing the illicit use in which the terminal and the head set (device mounted on the head to hear sound by earphone) are connected through the normalized short distance wireless communication standards such as Bluetooth (BT) for transmitting or receiving a music signal or a music playback control signal, and its connection state is used for determination of the authorized use.

In this case, for example, the head set mounted on the head to hear music by earphone by transmitting music from the portable telephone through the BT connection may be diverted for determination of a lock timing, using a certain framework originally provided for other purposes, whereby there is an advantage that there is no problem of the cost up or increased size associated with the illicit use prevention.

Herein, a technique has been offered in which the head set is provided with a mounting detection part for detecting whether or not the head set 10 is mounted on the user, thereby automatically controlling the establishment and disconnection of wireless communication connection with a music playback device that is the partner of wireless communication depending on a use state of the head set, and the head set automatically disconnects the wireless connection with the music playback device through this process, when not in use, achieving power saving (e.g., refer to patent document 3).

Also, another technique has been offered in which the office equipment with a voice operation function of inputting a voice command or outputting a voice message through the head set as a device for voice input/output in which a microphone and a headphone connected to the unit main body are integrated includes an input signal detection part for detecting the presence or absence of a signal from the microphone of the head set at the start time of use and voice output means including a function of outputting a message of large volume or a buzzer sound from the headphone of the head set if there is no signal of this input signal detection part, whereby the visibility disabled person can use the head set efficiently (e.g., refer to patent document 4).

Also, another technique has been offered in which the portable terminal monitors the signal level of a short distance wireless signal from the wireless communication device to restrict the use of predetermined function for the portable terminal if this signal level falls below a level that the connection state of the short distance wireless communication can not be maintained, or to transfer the wireless communication function part of the portable terminal and the wireless communication device to a specific operation mode if the short distance wireless communication is not used over a predetermined time, and in the specific operation mode, the response speed of detecting a change in the signal level is decreased to delay issuing a request for increasing the transmission power to the wireless communication device, when the portable terminal monitors the signal level of a wireless signal from the wireless communication device, thereby reducing a variation in the operable distance between the portable terminal unit and the wireless communication device making the short distance wireless communication with this terminal unit beyond which the user is notified that the distance is larger or the use of the portable terminal unit is restricted (e.g., refer to patent document 5).

Also, another technique has been offered in which the portable telephone including short distance wireless communication means and a communication device capable of making the transaction with the short distance wireless communication means of the portable telephone are provided, the communication device including response signal transmitting means for transmitting a response signal to the portable telephone in response to an origination from the portable terminal, and the portable terminal including monitor signal originating means for originating a monitor signal to the communication device via the short distance wireless communication means in starting the operation of a predetermined function provided for the portable telephone and restricted in the operation and function restriction releasing means for releasing the restriction of the operation of the predetermined function in case of receiving a response signal transmitted from the communication device in accordance with the originated monitor signal, thereby suppressing the illicit use by the third party effectively while suppressing an operation load of the user (e.g., refer to patent document 6).

Also, another technique has been offered in which the head set periodically monitors a signal from the remote communication device in a sleep state, and if this signal is detected, the wireless head set transits to an active state, whereby the user can be provided with the functionality sufficient for the user (e.g., refer to patent document 7).

Patent document 1: Japanese Patent Laid Open Publication No. 2002-300651
Patent document 2: Japanese Patent Laid Open Publication No. 2004-102682
Patent document 3: Japanese Patent Laid Open Publication No. 2004-297256
Patent document 4: Japanese Patent Laid Open Publication No. 2005-236579
Patent document 5: Japanese Patent Laid Open Publication No. 2006-020226
Patent document 6: Japanese Patent Laid Open Publication No. 2006-033025
Patent document 7: Japanese Patent Laid Open Publication No. 2003-524341

DISCLOSURE OF THE INVENTION

Problems to be Solved by the Invention

However, with the above related arts, in locking the terminal to prohibit the use, it was limited to the use of only a state as to whether or not the communication function is not in use, but difficult to use other states, for example, a state as to whether the essential function of the device is not in use.

The invention has been achieved to solve the above-mentioned problems. And it is an object of the invention to provide a terminal unit, a device unit, an illicit use prevention system, an illicit use prevention method and a program that can provide the safety of preventing the illicit use of others by using a state as to whether or not the essential function of the device is not in use in locking the terminal to prohibit the use.

Means for Solving the Problems

In order to accomplish the above object, the invention has the following features.

The present invention provides a terminal unit having network connection to a device unit, in which the terminal unit is not locked if the device unit is in use, and the terminal unit is locked after a predetermined first time if the network connection is disconnected, wherein the terminal unit makes a determination whether or not the device unit is in a use state, and the terminal unit is locked after a predetermined second time from a last operation signal from the device unit, if the device unit is not in use, irrespective of the network connection.

Also, the invention provides a device unit having network connection to a terminal unit, in which the terminal unit is not locked if the self-system is in use, and the terminal unit is locked after a predetermined first time if the network connection is disconnected, wherein the terminal unit makes a determination whether or not the device unit is in a use state, and the terminal unit is locked after a predetermined second time from a last operation signal, if the device unit is not in use, irrespective of the network connection.

Also, the invention provides an illicit use prevention system having network connection between a terminal unit and a device unit, in which the terminal unit is not locked if the device unit is in use, and the terminal unit is locked after a predetermined first time if the network connection is disconnected, wherein the terminal unit makes a determination whether or not the device unit is in a use state, and the terminal unit is locked after a predetermined second time from a last operation signal from the device unit, if the device unit is not in use, irrespective of the network connection.

Also, the invention provides an illicit use prevention method with a terminal unit and a device unit in network connection, in which the terminal unit is not locked if the device unit is in use, and the terminal unit is locked after a predetermined first time if the network connection is disconnected, wherein the terminal unit makes a determination whether or not the device unit is in a use state, and the terminal unit is locked after a predetermined second time from a last operation signal from the device unit, if the device unit is not in use, irrespective of the network connection.

Also, the invention provides a program for performing a process on a terminal unit having network connection to a device unit, in which the terminal unit is not locked if the device unit is in use, and the terminal unit is locked after a predetermined first time if the network connection is disconnected, the process including making a determination whether or not the device unit is in a use state, and the terminal unit is locked after a predetermined second time from a last operation signal from the device unit, if the device unit is not in use, irrespective of the network connection.

Advantage of the Invention

With the invention, it is possible to provide the safety of preventing the illicit use of others by using a state as to whether or not the essential function of the device is not in use in locking the terminal to prohibit the use.

BEST MODE FOR CARRYING OUT THE INVENTION

A first exemplary embodiment of the present invention will be described below in detail with reference to the drawings. Referring to FIG. 1, an illicit use prevention system according to the embodiment comprises a user terminal 10 (e.g., a portable telephone) and a device unit 20 (e.g., a head set with BT installed).

The user terminal 10 has at least the following configuration, in addition to the configuration and function of an ordinary portable telephone.

The device unit 20 has the configuration for realizing a normal head set function for hearing music, including an operation control part 24.

The user terminal 10 and the device unit 20 are connected by short distance wireless such as BT between the short distance wireless communication parts 11 and 21 to transmit music data.

The device unit 20 holds the personal ID in a personal ID holding part 22 inside it. In this communication, at least the user terminal 10 registers the transmitted personal ID intrinsic to the head set in a registered device ID holding part 12, and a short distance wireless communication part 11 can determine whether or not the user terminal is connecting to the device unit with the personal ID.

A terminal lock control part 13 controls a user interface part 14 to set or release a terminal lock. The terminal lock includes partly or entirely disabling all the operations at the user terminal 10, disabling some functions, or disabling some data to be referred to or updated.

A music playback control part 15 plays back music processed by a music processing part 16 inside the portable telephone, and sends this music data to the short distance wireless communication part 11 to generate data to be transmitted to the head set, and notify a current playback state to the terminal lock control part 13.

The device unit 20 plays back music received from the short distance wireless communication part 11 of the user terminal 10 from a speaker function part 23.

The operation of this embodiment will be described below in detail with reference to the drawings.

Originally, the user terminal 10, when it is a folding type, is automatically locked when five seconds, for example, have passed since the user terminal 10 is folded and closed, or when a non-operation state continues for one minute, for example, from the last button operation. However, if the device unit 20 is in a use state, this lock is suppressed, that is, the terminal unit is not locked but can be used continuously.

First of all, in starting to use the user terminal 10, the pairing setting for BT is performed. In the pairing, the personal ID of the device unit 20 held in the personal ID holding part 22 of the device unit 20 and sent included in the communication message by the short distance wireless communication part 21 is received by the short distance wireless communication part 11 at the user terminal 10, and stored as a device ID of the key in the registered device ID holding part 12.

In the following, the short distance wireless communication part 11 takes action only if the personal ID included in the communication is matched with the ID held in the registered device ID holding part 12 in confirming the communication, or if unmatched, ignores the communication.

Referring to FIG. 2, when the user terminal 10 is in an unlocked state, the user can operate the user terminal 10 (S201).

In this state, the user terminal 10 makes a determination whether or not the short distance wireless communication part 11 is in a communication state with the registered device unit 20 periodically, for example, at every second (S202). If the non-communication state is detected (S202/No), the user terminal 10 activates the lock in the terminal lock control part 13 after time t1 (e.g., 5 seconds) (S204), so that the user interface part 14 enters a locked state to disable the user terminal 10 to be operated (S205). The non-communication state may include automatically turning off the power for power saving after the passage of a predetermined time from the last operation of pressing the button in the device unit 20.

On the other hand, if the communication state with the registered device unit 20 in BT is detected (S202/Yes), a determination is made whether or not the device unit is in use by referring to a state of the music playback control part 15 (S203). For example, when the device unit 20 is in use, music is being played back at the user terminal 10 and this music data is being transmitted to the device unit 20 in BT. If the unused state continues for time t2 (e.g., five minutes) (S203/Yes), the non-use is determined, or if not (S203/No), the in-use is determined. If the device unit is in use, the unlock state is continued, whereby the user can manipulate the portable telephone.

If the device non-use state continues for time t2 (e.g., five minutes), the user terminal 10 activates the lock in the terminal lock control part 13 (S204) in the same way as when the non-communication state is detected, so that the user interface part 14 enters the lock state to disable the user terminal 10 to be operated (S205).

After the passage of t3 (<t2, e.g., four minutes), the user terminal 10 may transmit a warning message signal to the device unit 20, and the device unit 20 receiving this signal may raise a warning notice to the user in voice such as "power off in more one minute" or by flashing of the LED.

At the user terminal 10 entering the lock state, a user authentication operation is performed to release the lock (S206). The user authentication is performed by checking whether or not the inputted personal identification number is matched with the preset number, or checking whether or not the inputted biometric information such as fingerprint is matched with the registered information, whereby the user who presents data matched with the registered information is regarded as the authorized user and can use the user terminal 10 by releasing the lock.

With this technique, though the head set is powered on and placed in a BT connection so that the user terminal 10 may not be locked when the head set is not in use, the terminal is locked if the non-use state of the head set continues for t2 or more, such as while not playing back music. In a case where the user terminal 10 and the device unit 20 are put in a bag together and carried, the user terminal 10 is locked even if they are dropped together. Thereby, there is the effect of providing the safety of preventing the illicit use of others.

A second exemplary embodiment of the invention will be described below.

In addition to the implementation of the first exemplary embodiment, the device unit 20 comprises a head mounted state determination part 25 that is a determination mechanism for determining whether or not the head set is mounted on the head, as shown in FIG. 3. The presence or absence of mounting is checked depending on a difference between a detected temperature closer to the body temperature when the head set is mounted on the head and the air temperature when not mounted, using a temperature sensor, for example.

The head mounted state determination part 25 issues an operation control signal at an interval shorter than the time interval t2, if the head set is mounted on the head, and this signal is transmitted via the short distance wireless communication part 21 to the user terminal 10.

Thereby, at the user terminal 10, the device non-use state is not determined, whereby the unlock state is continued.

In this way, information as to whether or not the head set is mounted on the head is acquired by the device unit 20 and used for determining the presence or absence of lock activation by the user terminal 10, whereby even if the device unit 20 happens to be in the non-use state such as when music is not played back for a long time, the lock is suppressed as long as the head set is mounted on the head, providing convenience that the user can continue to use the user terminal 10. On the other hand, in a case where the device unit 20 is removed from the head, and the user terminal 10 and the device unit 20 are put in a bag together and carried, the non-use state is determined because the head set is not in the mounted state, whereby even if they are dropped together, the user terminal 10 is locked as in the previous embodiment. Thereby, there is the effect of providing the safety of preventing the illicit use of others.

The above embodiments are the preferred embodiments of the invention, and various modifications may be made without departing from the spirit or scope of the invention. For example, a program for implementing the function of the user terminal 10 and the device unit 20 may be read into each device and executed on each device to implement the function of each device. Further, the program may be provided via a computer readable record medium such as a CD-ROM or a magneto-optical disk, or distributed via a transmission medium such as the Internet or telephone line or over the transmission wave to the computer system.

INDUSTRIAL APPLICABILITY

The terminal unit, the device unit, the illicit use prevention system, the illicit use prevention method and the program according to the invention are applicable to the portable information processing apparatuses in general.

Figure 1:
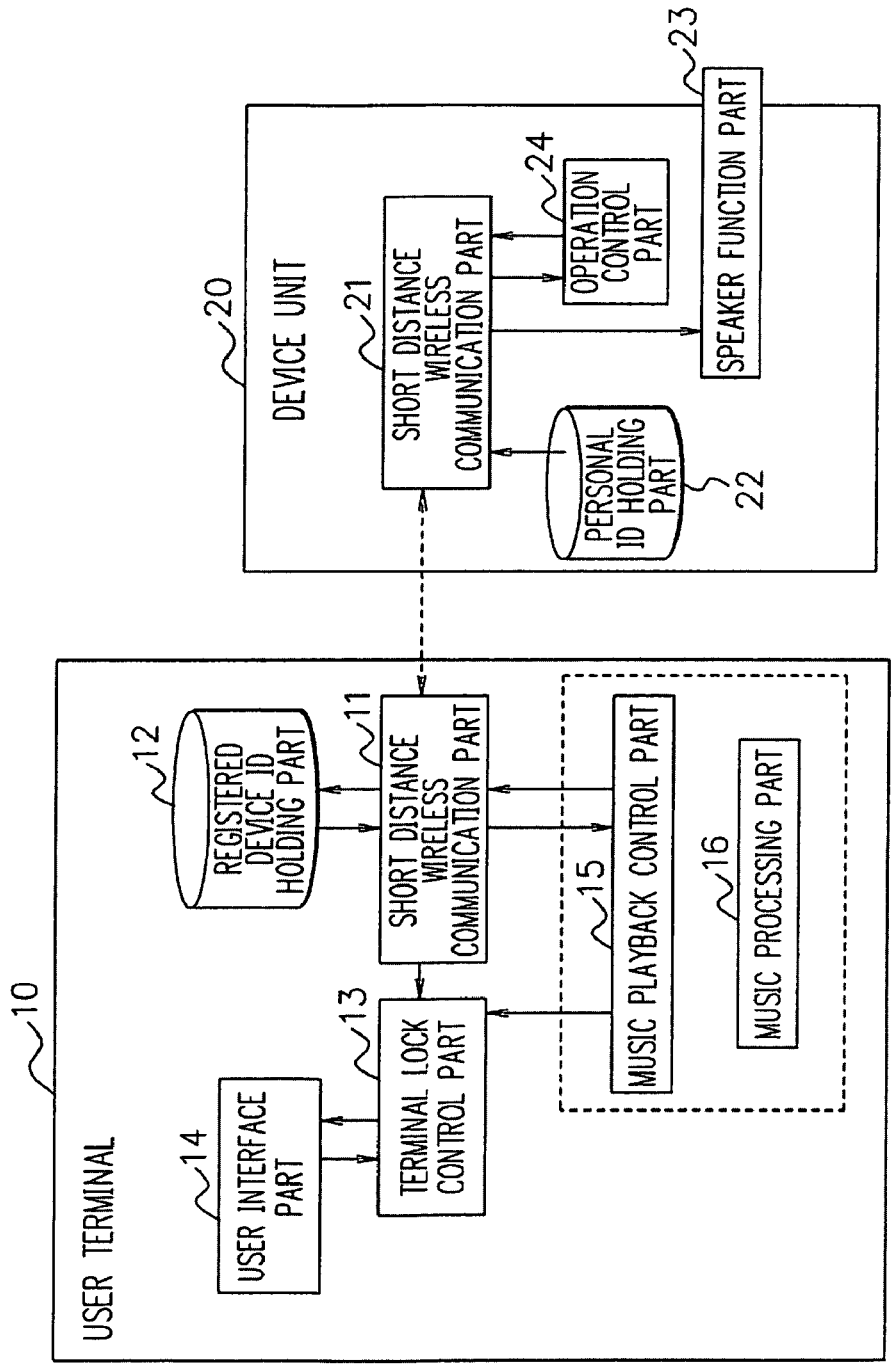
FIG. 1 is a diagram showing the configuration of an illicit use prevention system according to a first exemplary embodiment of the present invention.
Figure 2:
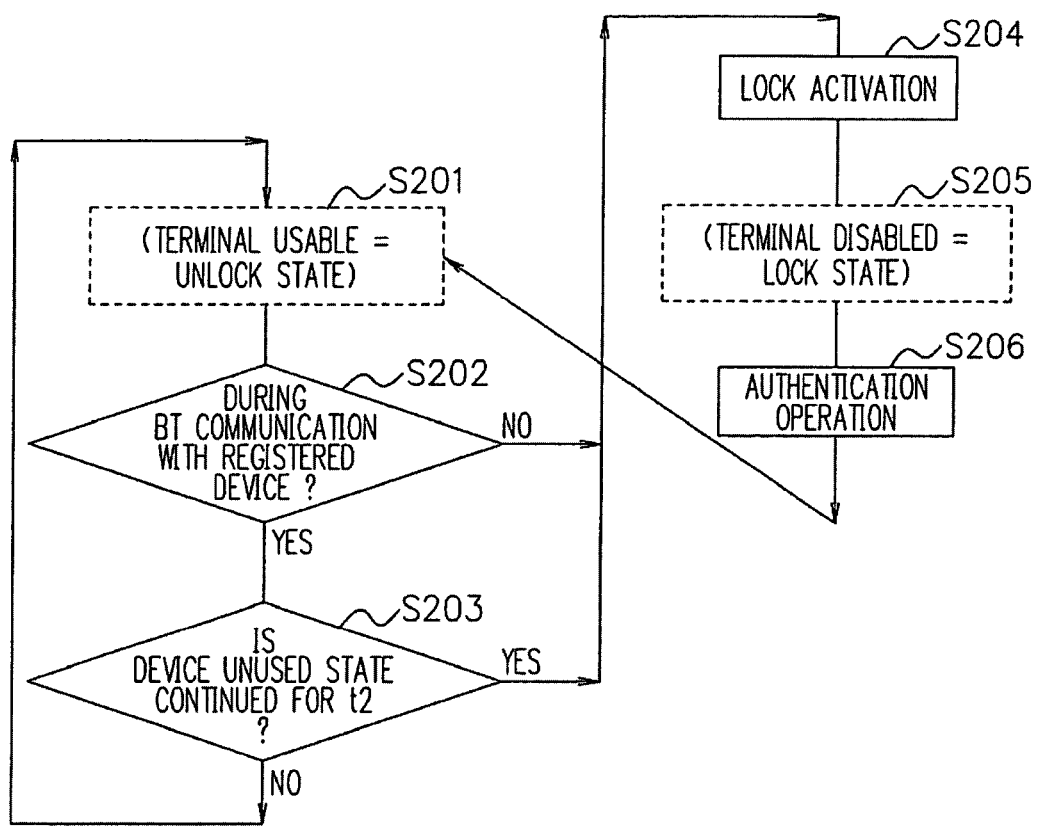
FIG. 2 is a flowchart showing a processing operation according to the first exemplary embodiment of the invention.
Figure 3:
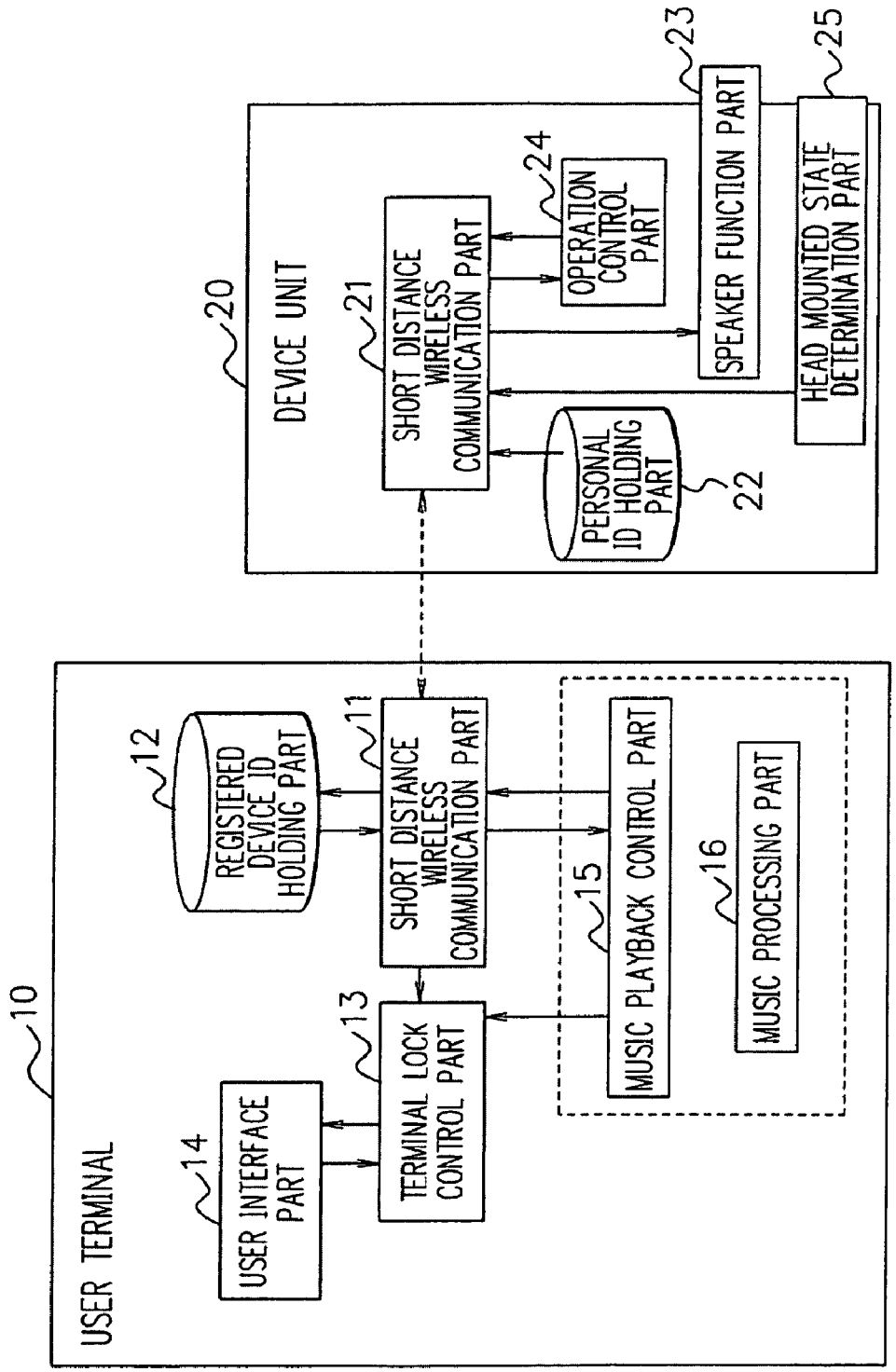
FIG. 3 is a diagram showing the configuration of an illicit use prevention system according to a second exemplary embodiment of the invention.

DESCRIPTION OF SYMBOLS 10 user terminal
11 short distance wireless communication part
12 registered device ID holding part
13 terminal lock control part
14 user interface part
15 music playback control part
16 music processing part
20 device unit
21 short distance wireless communication part
22 personal ID holding part
23 speaker function part
24 operation control part

The invention claimed is:

1. A terminal unit capable of performing short distance wireless communication to a head set as a designated communication counterpart, wherein:
   the terminal unit is not locked, if the terminal unit is playing back music and is transmitting music data corresponding to the played back music to the head set in a communication state by the short distance wireless communication;
   the terminal unit is locked after a predetermined first time, if the short distance wireless communication is disconnected; and
   the terminal unit determines a use state of the head set by determining whether or not the terminal unit is playing back music, and the terminal unit is locked after a predetermined second time from a last operation signal from the head set, if the terminal unit determines that the head set is not in the use state, irrespective of the short distance wireless communication
   wherein:
   a report signal of lock advance notice is transmitted to the head set after a predetermined third time shorter than the predetermined second time, and
   a control signal of suppressing the lock is received from the head set including a unit that determines whether or not the head set is in a state of readiness to use, after a predetermined fourth time shorter than the predetermined second time when in the state of readiness and the lock is suppressed.

2. A head set capable of performing short distance wireless communication to a terminal unit as a designated communication counterpart, wherein:
   the terminal unit is not locked if the terminal unit is playing back music and is transmitting music data corresponding to the played back music to the head set in a communication state by the short distance wireless communication;
   the terminal unit is locked after a predetermined first time, if the short distance wireless communication is disconnected;
   the terminal unit determines a use state of the head set by determining whether or not the terminal unit is playing back music, and the terminal unit is locked after a predetermined second time from a last operation signal from the head set, if the terminal unit determines that the head set is not in the use state, irrespective of the short distance wireless communication;
   wherein:
   a report signal of lock advance notice is received from the terminal unit after a predetermined third time shorter than the predetermined second time and a lock advance notice is reported to a user, and
   the head set comprises a unit that determines whether or not the head set is in a state of readiness to use, and a control signal of suppressing the lock is transmitted to the terminal unit after a predetermined fourth time shorter than the predetermined second time when in the state of readiness.

3. The head set according to claim 2, further comprising a unit that determines whether or not the head set is mounted on a user's head, and issues a control signal to the terminal unit at a predetermined interval shorter than the predetermined second time, wherein the control signal suppresses the lock when the head set is mounted on the user's head.

4. An illicit use prevention system comprising a terminal unit capable of performing short distance wireless communication to a head set as a designated communication counterpart, wherein:
   the terminal unit is not locked, if the terminal unit is playing back music and is transmitting music data corresponding to the played back music to the head set in a communication state by the short distance wireless communication;
   the terminal unit is locked after a predetermined first time, if the short distance wireless communication is disconnected; and
   the terminal unit determines a use state of the head set by determining whether or not the terminal unit is playing back music, and the terminal unit is locked after a predetermined second time from a last operation signal from the head set, if the terminal unit determines that the head set is not in the use state, irrespective of the short distance wireless communication;
   wherein:
   the head set receives a report signal of lock advance notice from the terminal unit after a predetermined third time shorter than the predetermined second time and reports the lock advance notice to a user, and
   the head set comprises a unit that determines whether or not the head set is in a state of readiness to use, and transmits a control signal of suppressing the lock to the terminal unit after a predetermined fourth time shorter than the predetermined second time when in the state of readiness.

5. An illicit use prevention method for a terminal unit capable of performing short distance wireless communication to a head set as a designated communication counterpart, wherein:
   the terminal unit is not locked, if the terminal unit is playing back music and is transmitting music data corresponding to the played back music to the head set in a communication state by the short distance wireless communication;

the terminal unit is locked after a predetermined first time, if the short distance wireless communication is disconnected; and the terminal unit determines a use state of the head set by determining whether or not the terminal unit is playing back music, and the terminal unit is locked after a predetermined second time from a last operation signal from the head set, if the terminal unit determines that the head set is not in the use state, irrespective of the short distance wireless communication;

wherein:

the head set receives a report signal of lock advance notice from the terminal unit after a predetermined third time shorter than the predetermined second time and reports the lock advance notice to a user, and the head set comprises a unit that determines whether or not the head set is in a state of readiness to use, and transmits a control signal of suppressing the lock to the terminal unit after a predetermined fourth time shorter than the predetermined second time when in the state of readiness.

6. A non-transitory computer-readable medium storing a program for performing a process on a terminal unit capable of performing short distance wireless communication to a head set as a designated communication counterpart, wherein:

the terminal unit is not locked, if the terminal unit is playing back music and is transmitting music data corresponding to the played back music to the head set in a communication state by the short distance wireless communication;

the terminal unit is locked after a predetermined first time, if the short distance wireless communication is disconnected;

the process comprises determining a use state of the head set by determining whether or not the terminal unit is playing back music, and locking the terminal unit after a predetermined second time from a last operation signal from the head set, if the head set is not in the use state, irrespective of the short distance wireless communication; and the process further comprises:

transmitting a report signal of lock advance notice to the head set after a predetermined third time shorter than the predetermined second time, and receiving a control signal of suppressing the lock from the head set including a unit that determines whether or not the head set is in a state of readiness to use after a predetermined fourth time shorter than the predetermined second time when in the state of readiness and suppressing the lock.

7. A non-transitory computer-readable medium storing a program for performing a process on a head set capable of performing short distance wireless communication to a terminal unit as a designated communication counterpart, wherein:

the terminal unit is not locked if the terminal unit is playing back music and is transmitting music data corresponding to the played back music to the head set in a communication state by the short distance wireless communication;

the terminal unit is locked after a predetermined first time, if the short distance wireless communication is disconnected;

the process comprises determining a use state of the head set by determining whether or not the terminal unit is playing back music, and locking the terminal unit after a predetermined second time from a last operation signal from the head set, if the head set is not in the use state, irrespective of the short distance wireless communication; and the process further comprises:

receiving a report signal of lock advance notice from the terminal unit after a predetermined third time shorter than the predetermined second time and reporting the lock advance notice to a user, and transmitting a control signal of suppressing the lock to the terminal unit after a predetermined fourth time shorter than the predetermined second time when in the state of readiness, with a unit that determines whether or not the head set is in a state of readiness to use.

* * * * *